(12) United States Patent
Riepenhoff

(10) Patent No.: US 6,809,754 B2
(45) Date of Patent: Oct. 26, 2004

(54) LASER LENS SYSTEM AND PROCESS FOR ILLUSTRATING A PRINTING FORM

(75) Inventor: Matthias Riepenhoff, Bern (CH)

(73) Assignee: Maschinenfabrik Wifag, Bern (CH)

(*) Notice: Subject to any disclaimer, the term of this patent is extended or adjusted under 35 U.S.C. 154(b) by 0 days.

(21) Appl. No.: 09/990,053

(22) Filed: Nov. 21, 2001

(65) Prior Publication Data

US 2002/0063773 A1 May 30, 2002

(30) Foreign Application Priority Data

Nov. 27, 2000 (DE) .......................................... 100 58 761

(51) Int. Cl.⁷ .............................................. B41J 27/00
(52) U.S. Cl. ..................................... 347/244; 347/258
(58) Field of Search .............................. 347/241, 244, 347/256, 258, 240, 247; 359/363, 664, 708, 710, 206, 641; 372/50

(56) References Cited

U.S. PATENT DOCUMENTS

| | | | | |
|---|---|---|---|---|
| 5,745,296 A | * | 4/1998 | Nakamura et al. | 359/641 |
| 5,790,576 A | | 8/1998 | Waarts et al. | 372/43 |
| 5,914,800 A | * | 6/1999 | Akatsu | 359/206 |
| 5,978,010 A | | 11/1999 | Hosokawa | 347/250 |
| 5,990,925 A | | 11/1999 | Sousa et al. | 352/53 |
| 6,144,685 A | * | 11/2000 | Iwasa et al. | 372/50 |

FOREIGN PATENT DOCUMENTS

| | | | |
|---|---|---|---|
| CA | 2260565 | 7/2000 | |
| CN | 01145061.4 | 3/1997 | |
| EP | 0 841 806 A2 | 5/1998 | |
| EP | 0 915 541 A2 | 5/1999 | |
| EP | 0 992 350 A1 | 4/2000 | |
| EP | 0 992 350 | 4/2000 | |
| JP | 9-211280 | * 8/1997 | ............ G02B/7/02 |

* cited by examiner

*Primary Examiner*—Hai Pham
(74) *Attorney, Agent, or Firm*—McGlew and Tuttle, P.C.

(57) ABSTRACT

The present invention pertains to a lens system for a laser for illustrating a printing form with at least one spherical lens. The spherical lens may be arranged between the laser and the printing form, in order to bundle laser light emitted by the laser. At least one aspherical lens is arranged between the spherical lens and the printing form, for focusing or converging the laser light onto a desired spot. A process is also provided for illustrating a printing form. A laser for exposing an area element of predetermined width and height is operated continuously. The laser light generated by the laser is focused by the lens system according such that a strip (L) is generated which has a width that approximately corresponds to the width of the area element to be exposed. The strip has a height (H) that is smaller than the height of the area element to be exposed. A laser light strip (L) generated is led over the area element to be exposed such that the entire height of the area element to be exposed is swept by the strip.

20 Claims, 4 Drawing Sheets

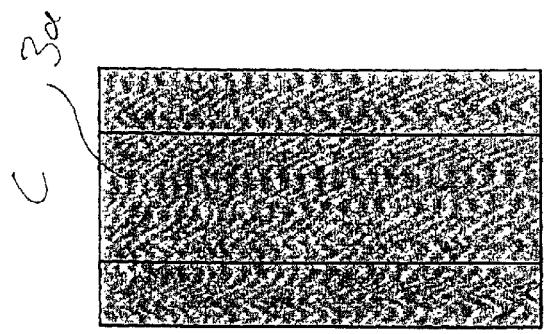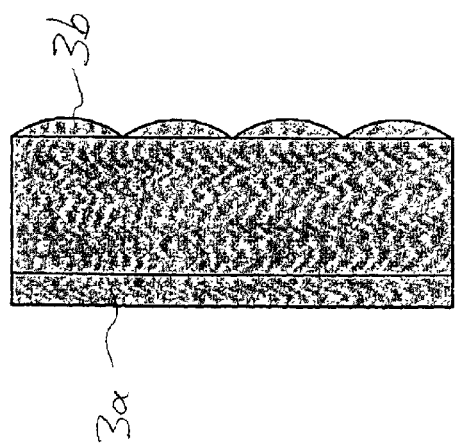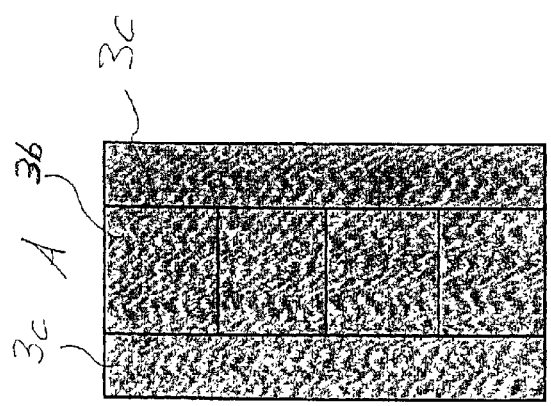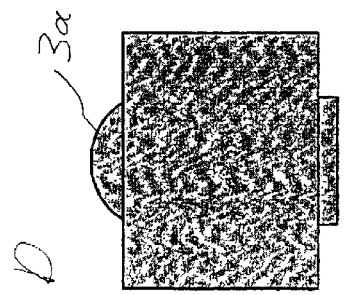
Fig. 2

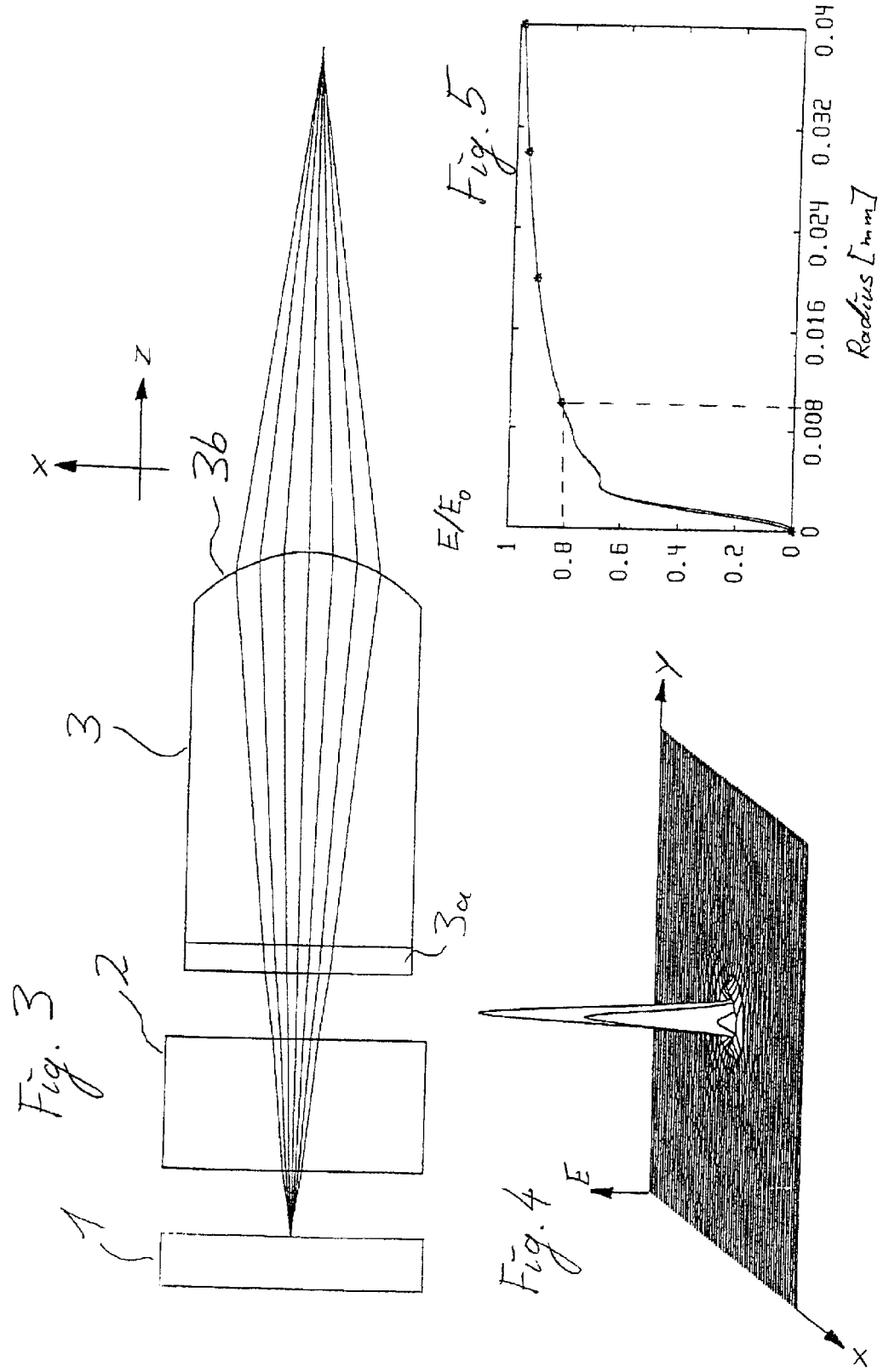

Fokus(z)  -0.137   -0.069   0.000   0.069   0.137

LASER LENS SYSTEM AND PROCESS FOR ILLUSTRATING A PRINTING FORM

FIELD OF THE INVENTION

The present invention pertains in general to an imaging device for illustrating a printing form, e.g., a printing plate mounted on a printing drum, which can be used, e.g., in web-fed rotary printing or newspaper printing. The present invention pertains, in particular, to an imaging optical system, especially a lens system, for an edge- or area-emitting laser, especially an edge- or area-emitting semiconductor laser diode, as well as to a process for illustrating a printing form.

BACKGROUND OF THE INVENTION

The use of lasers for illustrating printing plates has been known, and various processes are used to illustrate a printing plate with a laser beam. In the case of so-called inner drum exposure devices, the laser light beam is moved over the plate to be exposed, which is located in the drum, by using a multiple mirror rotating at a high speed. As a result of this, an image line is generated, and the rotating mirror is continuously moved along its axis of rotation in order to thus successively illustrate the entire plate surface by means of the laser. The laser light is modulated as a function of the image data such that the entire image can be generated on the printing plate. Furthermore, it has been known that an illustrating operation can be carried out in which the printing form is fastened outside on a cylinder or the cylinder surface itself forms the printing form, which is called the outer drum principle. This outer drum principle is used during the illustration of the printing form in the printing press. If a single laser were used, the printing form cylinder would have to be rotated at a high speed in order to carry out a complete illustration in an acceptable time, and the laser beam would have to be moved in parallel to the axis of rotation in order to illustrate the entire surface of the printing form. However, this process is technically extremely complicated because of the high speeds occurring. To make it possible to reduce the speed of rotation of the printing plate cylinder, a plurality of laser light sources are used, which are arranged as a laser array, in order to generate a plurality of columns of an image with such a laser array during each revolution of the printing form cylinder, and this array is moved along the printing form in order to illustrate the entire printing form.

For example, a plurality of laser diodes are used as the laser array, and the light emitted by the laser diodes is coupled into an optical fiber each and this light exits at the end of the fiber located opposite the printing plate as a light cone with an opening angle of, e.g., 16°, and is focused with lenses onto the printing form. Furthermore, edge-emitting laser diodes have been known, in which laser light exits in the form of a narrow strip, and one strip may have a width of, e.g., between 60 $\mu$m and 200 $\mu$m and a height of less than 1 $\mu$m. The laser light is emitted usually at a greater angle of radiation of, e.g., 35° to 40° in the vertical direction and at a smaller angle of, e.g., 8° to 10° in the horizontal direction. It is necessary to focus the laser light by a suitable imaging optical system onto the printing form to be illustrated such that the highest possible quality of the image generated by the laser light is achieved.

SUMMARY AND OBJECTS OF THE INVENTION

The object of the present invention is to propose an imaging optical system, a system and a process for illustrating a printing form with lasers, especially semiconductor lasers, which make it possible to generate images that meet the requirements in terms of quality and costs, e.g., in newspaper printing.

According to the invention, a laser lens system for illustrating a printing form is provided with at least one spherical lens which may be arranged between the laser and the printing form in order to bundle the laser light emitted by the laser. At least one aspherical lens may be arranged between the spherical lens and the printing form for focusing or converging the laser light onto a desired spot.

According to another aspect of the invention, a process for illustrating, a printing form is provided. A laser for exposing an area element of a predetermined width and height is operated continuously. The laser light generated by the laser is focused by the lens system such that a strip (L) is produced which has a width that approximately corresponds to the width of the area element to be exposed. The strip has a height (H) that is smaller than the height of the area element to be exposed. The laser light strip (L) generated is led over the area element to be exposed such that the entire height of the area element to be exposed is swept by the strip (L).

The lens system according to the present invention, which can be used as an imaging optical system for lasers, especially edge-emitting semiconductor laser diodes for illustrating a printing form, e.g., a printing plate on a printing drum, preferably has at least one spherical lens. This can be arranged between one or more laser light sources and a printing form to be illustrated for bundling the laser light emitted by one or more lasers. It is not absolutely necessary to focus the laser light. It is sufficient to reduce the angle of radiation of the laser light. Furthermore, the lens system has at least one aspherical lens, which is preferably arranged between the spherical lens and the printing form to be illustrated in order to converge the laser light focused by the at least one spherical lens and preferably to perform a correction of the spherical aberration, wherein the lens system is preferably directed such that the smallest possible irradiation angle is obtained at the printing form to be illustrated in order to obtain a great depth of field. High-quality illustration can be performed with the combination of spherical and aspherical lenses for focusing the light emitted preferably by an edge- or area-emitting laser on the printing form, because the spherical lens, which is usually ground, has a good surface finish and thus it can focus the light emitted by the laser at a certain angle of radiation without causing an imaging error due to surface inaccuracies. Such an imaging error directly after the emitting area of the laser would lead to a greater inaccuracy on the printing form. The at least one aspherical lens arranged behind the spherical lens in the beam direction of the laser light is usually prepared by pressing and cannot be ground like the spherical lens, so that the aspherical lens can be manufactured with a greater precision in terms of its desired curvature than the spherical lens, but it has a lower surface finish. Consequently, very good focusing of the laser light bundled by the spherical lens can be obtained with the at least one aspherical lens because its curvature can be manufactured with a very high precision, and errors and inaccuracies on the surface of the at least one aspherical lens have hardly any noticeable effect on the imaging, because only the radiation area of the laser located in the object plane of the lens system is imaged sharply, and surface inaccuracies, e.g., scratches, are imaged only diffusely with at extremely low power and thus lead qualitatively to a hardly noticeable deterioration. The at least one spherical lens used to bundle the laser light can consequently perform an accurate bundling of the laser light emitted by a laser because of the good surface finish, and essentially only spherical aberration occurs as an error. The downstream aspherical lens can bring about the most accurate focusing possible of the laser light because the desired curvature can be manufactured with precision, and the spherical aberration of the first lens is corrected. Surface errors of the downstream aspherical lens do not lead to a noticeable loss of quality of the imaging, as it would happen in the case of a lens that is arranged in the vicinity of the object. Thus, accurate focusing of the laser light emitted by a laser, e.g. an edge- or area-emitting laser, on a printing form can thus be obtained for the illustration due to the combination of spherical and aspherical lenses according to the present invention.

Spherical as well as aspherical lenses can preferably also be manufactured according to an injection molding process in the case of a lens made of plastic. An aspherical lens thus manufactured can have a desired curvature, which is not possible in the case of the spherical lenses manufactured according to the grinding process.

However, a spherical lens can also be done away with altogether, e.g., when the at least one aspherical lens can ensure illustration with sufficient quality, because, e.g., the laser light already exits from the laser in a sufficiently bundled form at a small angle of radiation.

Consequently, a fiber optic system can be done away with for directing light emitted by a laser onto the printing form.

The term spherical lens is defined according to the present invention as one or more optical elements which have a surface that has in a cross section at least an area that has an approximately constant radius of curvature, e.g., biconvex or planoconvex lenses, wherein a spherical lens may be, e.g., a round convergent lens with spherical surface or a cylinder lens, which may have, e.g., the shape of half of a full cylinder, so that the laser light enters, e.g., on the cut surface of the half cylinder and exits in the focused form through the jacket surface of the half cylinder.

An aspherical lens according to the present invention may comprise one or more optical elements which have one or more curved surface areas that are essentially nonspherical, i.e., have no constant radius of curvature.

The at least one spherical lens is preferably designed as a cylinder lens, so that the laser light, which is emitted, e.g., by an edge-emitting laser in a direction at right angles to the radiation direction and at right angles to the emitting area of the laser (hereinafter called vertical direction) usually at a greater angle of radiation of, e.g., 35° to 40°, can be focused over the entire length of the emitting laser area, and no focusing of the laser light takes essentially place in the horizontal direction, i.e., in parallel to the emitting area, because the angle of radiation of an edge-emitting laser is comparatively small in the horizontal direction, i.e., e.g., only 8° to 10° C., so that bundling or focusing can also take place at a greater distance from the emitting area.

An optical element is advantageously provided in the lens system, and a first lens or lens system, at which laser light enters the optical element, is provided on one side of the optical element, and a second lens or lens system, through which laser light exits from the optical element, is provided on the opposite side of the optical element. The first and/or second lens or lens system may be a spherical or aspherical lens, so that, e.g., a body is created which has a spherical lens on one side and an aspherical lens on the opposite side or spherical or aspherical lenses on both sides. A plurality of lenses may also be arranged next to one another, and the lenses may be designed such that the lens(es) on one side of the body brings (bring) about focusing in a first or vertical direction and the lens(es) on the other side of the body brings (bring) about focusing in a second or horizontal direction, wherein the first and second directions may also have an angle of between 0° and 90° to one another. However, it is also possible to embody the combination of such lenses or lens systems with separate optical elements, i.e., these lenses or lens systems do not have to be embodied as a body. It is especially advantageous in this case to coordinate the lenses with one another such that the image plane in the horizontal direction approximately or exactly coincides with the image plane in the vertical direction, i.e., the imaging paths for a horizontal and vertical imaging are identical or essentially the same. Since it is possible due to the use of cylinder lenses to act on different positions along the beam path in the vertical and horizontal directions of the laser radiation, it is possible to obtain different imaging scales for the vertical and horizontal direction despite equal beam paths. The angle of incidence of the laser radiation on the printing form can be reduced by an enlarging imaging, which increases the depth of field. Conversely, a reducing imaging brings about a reduction in the depth of field.

The system according to the present invention for illustrating a printing form has a lens system as described above and has one or more lasers, preferably edge- or area-emitting lasers in order to generate a desired image with suitable modulation of the laser light.

The system is preferably designed such that the focal point of the spherical lens or spherical lens system arranged in the vicinity of the laser is located behind the emitting area of the laser in order to achieve a bundling of the emitted laser light, but no focusing, which is subsequently performed by the aspherical lens(es).

A printing form is preferably part of the system described, and the printing form may be, e.g., a so-called process-free printing plate, which is illustrated on a printing drum or as an alternative also separated from a printing drum. This can be brought about by moving the laser or the lens system relative to the resting or moving, e.g., rotating printing form, in which case the laser and/or the lens system may also stand still or move, e.g., along an axis of rotation of the printing form. The illustration may take place, e.g., by slowly displacing the rotating printing form cylinder along its axis of rotation, in which case the laser with the lens system may stand still. In general, the present invention comprises all fields of application in printing in which a printing form is illustrated with light, and the present invention is used especially in wet offset rotary printing presses, in web-fed rotary printing and preferably for newspaper printing and/or newspaper jobbing, in which a large number of printing forms are usually to be prepared in a short time.

According to the process according to the present invention for illustrating a printing form, a laser or a laser array is operated continuously for illustrating a surface element of a predetermined width and height, and the laser light emitted, e.g., by an edge- or area-emitting laser is focused by the above-described lens system on the printing form such that a focused strip is obtained, which has a width that is essentially equal to the width of the area element to be exposed, and the height of the strip is smaller than the height of the area element. The strip is led over the area element such that the entire height of the area element is essentially swept by the focused laser light strip, as a result of which a defined area element can be completely exposed.

If, e.g., a light exit of a size of 60 $\mu m \times 1$ $\mu m$ of an edge-emitting laser is focused on the printing form such that a fourfold enlargement of the beam is obtained in the vertical direction, while a 1:1 imaging takes place in the horizontal direction, an incidence angle of 8°–10° is obtained, e.g., in both directions. The image of the strip now has a size of 60 μm×4 μm and can still be considered to be a narrow strip. Moreover, the blur caused by the diffraction is greater than the spot height. If an area element of approx. 60 μm×60 μm is to be generated from this strip, the laser would have to be switched on for 60 μsec at a printing form speed of 1 m/sec. It is also possible to generate smaller area elements by shorter on times, e.g., 60 μm×30 μm, with an on time of 30 μsec. The on times are typically several μsec, e.g., in the range of 1–100 μsec, especially 10–90 μsec or 30–70 μsec, which is considered to be continuous operation (continuous wave) in connection with semiconductor laser diodes.

The laser or the laser array can be either switched off after the exposure of the area element until positioning of a new area element to be exposed has been performed, or it may continue to operate if another area element shall be exposed immediately after the exposure operation performed.

It is also possible to use the laser optical system for pulsed operation, in which case the same advantages result as in continuous operation.

The present invention will be described below on the basis of preferred embodiments. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiments of the invention are illustrated.

BRIEF DESCRIPTION OF THE DRAWINGS

In the drawings:

FIG. 2A is a front view of an optical element from FIG. 1;

FIG. 2B is a top view of an optical element from FIG. 1;

FIG. 2C is a top view of an optical element from FIG. 1;

FIG. 2D is a side view of an optical element from FIG. 1;

FIG. 3 is a top view of the lens system from FIG. 1 to illustrate the focusing of the beam path in the horizontal direction;

FIG. 4 is a view showing the distribution of the energy density of a light beam emitted by a punctiform light source on a printing form;

FIG. 5 is a view showing the part of the energy reaching a circle with its center on the focusing point in relation to the total entering light energy as a function of the radius of the circle;

DESCRIPTION OF THE PREFERRED EMBODIMENTS

Figure 1:
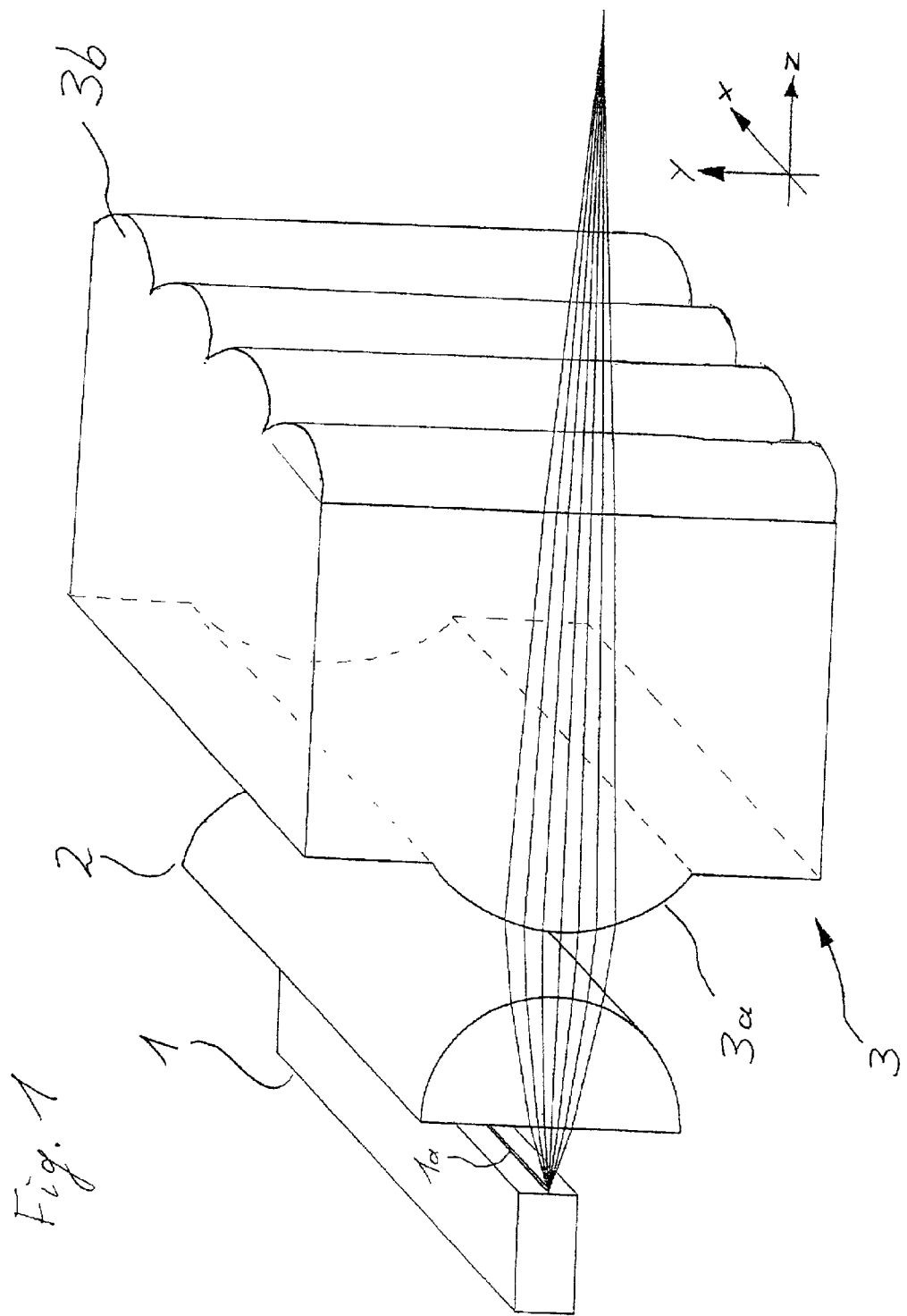
FIG. 1 is a lens system according to the present invention with an edge-emitting laser and focusing of the beam path in the vertical direction.

Referring to the drawings in particular, FIG. 1 shows an edge-emitting laser 1, which emits laser light in a laser light-emitting area 1a, the laser light being directed toward a spherical cylinder lens 2. The beam path shown in FIG. 1 is used to illustrate the bundling of the laser light in the vertical direction, represented by the y axis in the system of coordinates shown. The laser light reaching the spherical cylinder lens 2 with a relatively large angle of radiation is bundled and directed toward the optical element 3, which has, extending in parallel to the spherical cylinder lens 2, an aspherical lens 3a in order to focus the bundled laser light. The laser light focused by the aspherical lens 3a passes through the optical element 3 and exits on the rear side of the optical element without the beam path of the laser light being changed in the vertical direction, because the aspherical lenses 3b extending in the vertical direction (y direction) do not cause a deflection of the laser light in the vertical direction. Thus, bundling of the laser light emitted by the edge-emitting laser 1 in the y direction can be achieved with the lens system shown in FIG. 1, which consists of a spherical cylinder lens 2 and the optical element 3 with the aspherical lens 3a, and the laser spot generated represents an imaging of the exiting light strip that is enlarged in the vertical direction.

FIG. 3 shows a top view of a partial area of the system shown in FIG. 1 to illustrate the bundling of the beam path in the horizontal or x direction. Only an aspherical lens 3b of the optical element 3, which extends in the vertical direction, is shown for simplification. A laser beam emitted by a punctiform light source of the laser 1 passes through the spherical lens 2 without being essentially deflected in the horizontal direction, and it enters the optical element 3, and the fanned-out laser beam is essentially not deflected by the aspherical lens 3a, either. On exiting from the optical element 3, the fanned-out laser light passes through an aspherical lens 3b extending in the vertical direction, which focuses the laser light on a predetermined point, e.g., on a printing form, and the laser spot represents a 1:1 imaging of the exiting light strip in the horizontal direction.

It can thus be recognized from the beam paths shown in FIGS. 1 and 3 that the focusing of the laser light in the vertical direction is obtained by a combination of a spherical lens 2 and an aspherical lens 3a, and the focusing in the horizontal direction is brought about by the aspherical lens 3b, so that a mutually coordinated focusing of the laser light is made possible in the case of a laser with different emission characteristics in the horizontal and vertical directions. Since the laser light has generally a greater angle of radiation in the vertical direction than in the horizontal direction in the case of an edge-emitting laser 1, the spherical lens 2 for bundling the laser light is arranged in the immediate vicinity of the laser 1 and should have a high-quality surface to obtain a high imaging quality. To focus the laser light in the horizontal and vertical directions, aspherical lenses 3a and 3b are used, which do not need to have a high-quality surface, like the spherical lens 2, because the aspherical lenses 3a and 3b are located at a greater distance from the laser 1 and thus they make surface errors noticeable on the printing form only slightly in the form of diffuse scattering. Since the angle of radiation of an edge-emitting laser 1 is considerably smaller in the horizontal direction than in the vertical direction, it is possible, e.g., to eliminate a lens in the vicinity of the laser for collecting the laser light in the horizontal direction. However, such a lens may also be additionally provided.

As an alternative to the arrangement shown in FIGS. 1 and 3, various other arrangements may be used, and, e.g., the lenses 3b used to bundle the light in the horizontal direction may be arranged closer to the spherical lens 2 than the lens 3a for bundling the laser light in the vertical direction. Furthermore, it is conceivable, e.g., to make all lens systems separate from one another, i.e., e.g., to provide separate lens systems 3a and 3b, or, e.g., to combine the spherical lens 2 with one of the aspherical lenses 3a or 3b in one optical element. It is also conceivable to integrate the entire lens system in a single optical element, which can be embodied, e.g., by the use of different materials with different refractive indices, so that, e.g., the aspherical lens 3a or any other lens can be embodied within such a one-piece optical element by the use of a material with a refractive index different from that of the surrounding material.

FIG. 2 shows different views of the optical element 3 shown in FIG. 1, with FIG. 2A showing a top view of the optical element 3 from the side of the aspherical lenses 3b and also showing projecting areas 3c of the optical element 3 which are not shown in FIG. 1 above and below the aspherical lenses 3b. FIG. 2B shows a top view of the optical element 3 in FIG. 1. FIG. 2C shows a view of the optical element 3 of the side with the aspherical lens 3a (rear view). FIG. 2D shows a side view of the optical element 3, always with projecting areas 3c.

FIG. 4 shows the energy distribution of a laser light emitted by a punctiform light source and focused by the lens system to a spot in the x-y plane on the printing form, and it can be seen that it essentially does not reach the printing form outside the focusing area.

FIG. 5 shows quantitatively the distribution of the incident energy of a punctiform light source around the focusing point. Thus, nearly 100% of the entire incident energy $E_0$ will enter within an area of 0.04 mm around the focusing point, and 80% of the energy will enter in a circle within a radius of about 0.01 mm around the focusing point; this is indicated by the broken line in FIG. 5.

Figure 6:
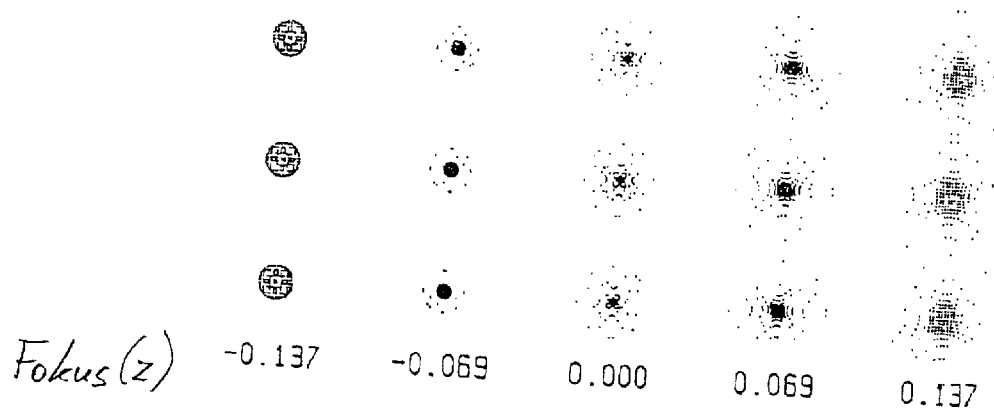
FIG. 6 is a view showing focused light spots as a function of the displacement of the printing form for accurate focusing.

FIG. 6 shows the focusing of three light spots falling on a printing form one over another in case of accurate positioning of the printing form in the focusing area; middle three spots. The printing form moved by 0.069 mm and 0.137 mm in the z direction generates the images shown in FIG. 6 to the right and left of the exactly focused points, in which the energy distribution is no longer concentrated on the center.

Figure 7:
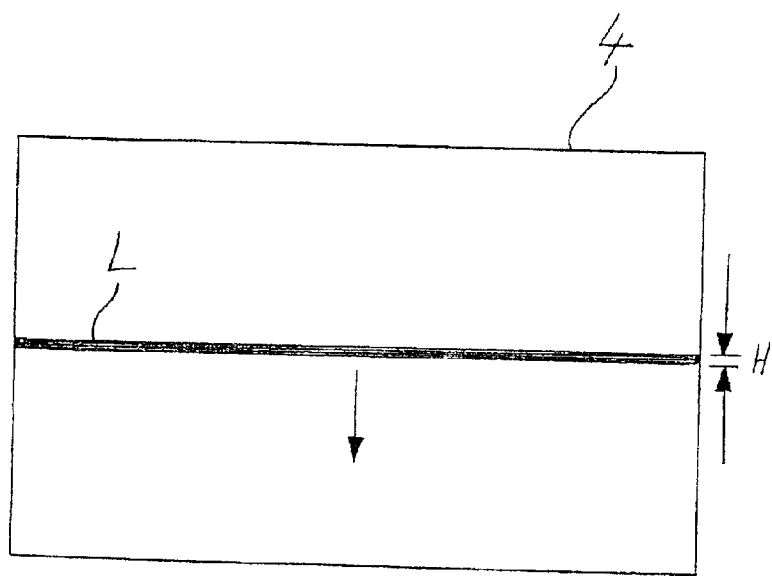
FIG. 7 is a view showing the exposure of an area element with a laser according to the process according to the present invention.

FIG. 7 illustrates a process for exposing an area element 4 with a focused laser light strip L, which sweeps the area element 4 from top to bottom in the embodiment being shown in FIG. 7, where the height H of the laser light strip is approx. 5 µm in case of a laser light strip with a lateral extension of, e.g., 60 µm to 100 µm in order to completely expose the area element 4. A not particularly accurate focusing of the laser emitted over the entire length 1a onto the laser light strip L for the exact exposure of the area element 4 is of rather secondary importance, because such inaccuracies in focusing affect only the edge areas with the release of a relatively small amount of energy outside the area element 4 and a horizontally inaccurate focusing, e.g., in the middle area of the laser light strip L still leads to an exposure within the desired area.

While specific embodiments of the invention have been shown and described in detail to illustrate the application of the principles of the invention, it will be understood that the invention may be embodied otherwise without departing from such principles.

What is claimed is:

1. A laser lens system for illustrating a printing form, the system comprising:
   an edge-emitting laser providing a one-dimensional light source;
   at least one spherical lens arranged between the laser and the printing form in order to bundle a laser light emitted by the laser; and
   at least one optical element arranged between the spherical lens and the printing form for focusing or converging the laser light onto a desired spot on the printing form, said optical element further comprising:
   a first aspherical lens focusing or converging said laser light in a first direction;
   a second aspherical lens focusing or converging said laser light in a second direction, wherein said first aspherical lens and said second aspherical lens are arranged such that a coordinated focusing is performed to generate a desired spot focused on the printing form in said first and said second direction.

2. A lens system in accordance with claim 1, wherein said at least one spherical lens is a cylinder lens.

3. A lens system in accordance with claim 2, wherein said first and second aspherical lenses are integrated together as an optical element.

4. A lens system in accordance with claim 1, wherein said first and second aspherical lenses are integrated together as an optical element.

5. A lens system in accordance with claim 1, wherein at least one of said spherical lens, said first aspherical lens and said second aspherical lens has, in a first direction, a focusing point coinciding with at least another of said spherical lens, said first aspherical lens and said second aspherical lens for focusing the laser light in a second direction.

6. A lens system in accordance with claim 1, wherein at least one of said spherical lens, said first aspherical lens and said second aspherical lens has, in a first direction, a focusing point coinciding with another of said first and second aspherical lenses for focusing the laser light in a second direction.

7. A lens system in combination accordance with claim 1, wherein said spherical lens is arranged in front of an emitting area of the laser such that the focal point of the spherical lens is located at a greater distance from the spherical lens than from the light-emitting area.

8. A lens system according to claim 1, wherein the focused or converged light forms a strip area with a height much smaller than a width whereby the strip area is moved relative to the printing form to expose the printing form.

9. A process for illustrating a printing form, the process comprising:
   continuously operating a laser for exposing an area element of a predetermined width and height;
   generating the laser light with the laser focused by a lens system with at least one spherical lens arranged between the laser and the printing form in order to bundle the laser light emitted by the laser and at least a first aspherical lens and a second aspherical lens arranged between the spherical lens and the printing form for focusing or converging the laser light directly onto a desired spot on the printing form as a strip is produced directly by said focusing or converging and having a strip width that approximately corresponds to the width of the area element to be exposed, wherein the strip has a strip height that is smaller than the height of the area element to be exposed and the strip height is much smaller than the strip width;
   wherein said first aspherical lens focuses or converges said laser light in a first direction, said second aspherical lens focuses or converges said laser light in a second direction, said first and second aspherical lenses perform a coordinated focusing to focus said laser light on a desired spot on the printing form in said first and second direction; and leading the laser light strip generated over the area element to be exposed such that the entire height of the area element to be exposed is swept by the strip.

10. A process in accordance with claim 9, wherein the laser is switched off when the strip has swept the entire height of the area element to be exposed.

11. A process in accordance with claim 9, wherein said first and second aspherical lenses are integrated together as an optical element.

12. A process in accordance with claim 9, wherein said at least one spherical lens is a cylinder lens.

13. A process in accordance with claim 9, wherein said first and second aspherical lenses are integrated together as an optical element.

14. A process in accordance with claim 9, wherein at least one of said spherical lens, said first aspherical lens and said second aspherical lens has, in a first direction, a focusing point coinciding with at least another of said spherical lens, said first aspherical lens and said second aspherical lens for focusing the laser light in a second direction.

15. A process in accordance with claim 9, wherein at least one of said spherical lens, said first aspherical lens and said second aspherical lens has, in a first direction, a focusing point coinciding with another of said first and second aspherical lenses for focusing the laser light in a second direction.

16. A process in combination according to claim 9, wherein the laser is an edge-emitting semiconductor laser diode.

17. A process in combination accordance with claim 16, wherein said spherical lens is arranged in front of an emitting area of the laser such that the focal point of the spherical lens is located at a greater distance from the spherical lens than from the light-emitting area.

18. A laser lens system for illustrating a printing form without a mirror, the system comprising:

an essentially one-dimensional edge-emitting laser emitting single beam laser light;

at least one spherical lens arranged between the laser and the printing form in order to bundle the single beam laser light emitted by the laser; and at least one optical element arranged between the spherical lens and the printing form for focusing or converging the single beam laser light directly onto a desired spot on the printing form, said optical element further comprising:

a first aspherical lens focusing or converging said laser light in a first direction;

a second aspherical lens focusing or converging said laser light in a second direction, wherein said first and said second aspherical lenses are arranged to coordinate focusing and to focus said laser light at a desired spot on the printing form in said first and said second direction.

19. A lens system according to claim 18, wherein the focused or converged light forms a strip area with a height much smaller than a width whereby the strip area is moved relative to the printing form to expose the printing form.

20. A method for laser-focused printing, the method comprising the steps of:

emitting a laser light from a laser;

bundling said laser light through a spherical lens;

focusing said laser light through a first aspherical lens along a first axis;

focusing said laser light through a second aspherical lens along a second axis;

focusing said laser light on a desired spot on a printing form; and actuating an effect on said printing form to illustrate said printing form using said laser light.

* * * * *